(12) United States Patent
Chou et al.

(10) Patent No.: US 7,961,158 B2
(45) Date of Patent: Jun. 14, 2011

(54) CONSTANT-CURRENT DRIVING CIRCUIT

(75) Inventors: Yi-Chung Chou, Taipei (TW); Hsu-Min Chen, Hsinchu (TW)

(73) Assignee: ITE Tech. Inc., Hsinchu (TW)

( * ) Notice: Subject to any disclaimer, the term of this patent is extended or adjusted under 35 U.S.C. 154(b) by 993 days.

(21) Appl. No.: 11/781,969

(22) Filed: Jul. 24, 2007

(65) Prior Publication Data

US 2008/0290906 A1 Nov. 27, 2008

(30) Foreign Application Priority Data

May 22, 2007 (TW) .............................. 96118192 A

(51) Int. Cl.
*G09G 3/32* (2006.01)
(52) U.S. Cl. ........................................................ 345/82
(58) Field of Classification Search .................... 345/76, 345/82, 84, 102, 204; 327/77; 313/498, 313/501; 324/605, 606; 315/169.3
See application file for complete search history.

(56) References Cited

U.S. PATENT DOCUMENTS

| 5,815,025 A | * | 9/1998 | Kubota ........................ 327/514 |
| 6,161,910 A | * | 12/2000 | Reisenauer et al. ........... 315/309 |
| 7,235,954 B2 | * | 6/2007 | Murakami .................... 323/222 |

FOREIGN PATENT DOCUMENTS

| JP | 2001-215913 | 8/2001 |
| JP | 2005-116859 | 4/2005 |
| JP | 2007-095907 | 4/2007 |

OTHER PUBLICATIONS

"Office Action of Japan Counterpart Application", issued on Sep. 7, 2010, p. 1-p. 2, in which the listed references were cited.

* cited by examiner

*Primary Examiner* — Amare Mengistu
*Assistant Examiner* — Abbas Abdulselam
(74) *Attorney, Agent, or Firm* — Jianq Chyun IP Office

(57) ABSTRACT

A constant-current driving circuit includes a first current source, a reference voltage generating circuit and an output signal generating circuit. A terminal of the first current source is coupled to a terminal of a first LED string, wherein the terminal of the first current source has a first voltage. The reference voltage generating circuit is used for generating a reference voltage and comparing the first voltage with a first predetermined voltage to generate a first comparing signal to thereby adjust the reference voltage. The output signal generating circuit is used for outputting an output signal to another terminal of the first LED string and receiving the input signal, wherein the output signal generating circuit decides whether or not to output the input signal serving as the output signal according to the comparison result of the reference voltage with the second voltage.

40 Claims, 12 Drawing Sheets

CONSTANT-CURRENT DRIVING CIRCUIT

CROSS-REFERENCE TO RELATED APPLICATION

This application claims the priority benefit of Taiwan application serial no. 96118192, filed May 22, 2007. All disclosure of the Taiwan application is incorporated herein by reference.

BACKGROUND OF THE INVENTION

1. Field of the Invention

The present invention generally relates to a driving circuit, and more particularly, to a constant-current driving circuit.

2. Description of Related Art

FIG. 1 is a coupling diagram between a conventional constant-current driving circuit and a driven LED string. The conventional constant-current driving circuit 110 is for driving an LED string 121 formed by light emitting diodes (LEDs) 120 connected in series. The constant-current driving circuit 110 also receives an input signal VIN via an inductor 130 and performs voltage dividing on the output signal VOUT by using resistors 140 and 150 so as to obtain a voltage VR and conduct feedback control by using the voltage VR.

The constant-current driving circuit 110 includes a current source 111, a comparator 112, a timing control circuit 113, a P-type metal oxide semiconductor (PMOS transistor) 114 and an N-type metal oxide semiconductor (NMOS transistor) 115. The positive terminal of the current source 111 is coupled to the LED string 121 and the negative input terminal thereof is coupled to a common voltage level GND. The comparator 112 is employed for comparing the voltage VR with a fixed reference voltage FVREF to generate a comparison result CRS, then the timing control circuit 113 generates timing control signals TCS1 and TCS2 to respectively control the PMOS transistor 114 and the NMOS transistor 115 for turning on or off according to the comparison result CRS. By switching on the above-mentioned two MOS transistors, the required output signal VOUT is generated for driving the LED string 121.

In order to make the current source 111 work normally, the negative terminal voltage of the LED string 121 must be higher than or equal to the operation voltage VW of the current source 111 itself. That is, the output signal VOUT generated by the constant-current driving circuit 110 must have a voltage level greater than the sum of the total voltage drop across the LED string 121 and the operation voltage VW. For example, assuming a single LED 120 with a current I passes there-through has a forward bias voltage VF, the total voltage drop across N pieces of LEDs 120 should be N×VF. Thus, the voltage level of the output signal VOUT must be greater than N×VF+VW to ensure the normal operation of the current source 111.

The output signal VOUT of the constant-current driving circuit 110 is given by the following formula (1):

$$VOUT=FVREF \times ((R1+R2)/R2) \qquad (1)$$

wherein R1 and R2 respectively represent the resistance of the resistors 140 and 150. Although the voltage level of the output signal VOUT is required to be sufficiently high to ensure the normal operation of the current source 111, however, in case where a variation of the forward bias voltage VF caused by process reasons occurs or the current I passing through the LED string 121 is adjustable, the total voltage drop across the LED string 121 may be less than the initially required total voltage drop. In addition, after the fixed reference voltage FVREF and the resistance of the resistors 140 and 150 are known, the output signal VOUT fails to be optimized to fit different LED strings 121, which makes a spare voltage drop applied to the current source 111 causing an efficiency loss and resulting in unwanted heat generation in the constant-current driving circuit 110.

SUMMARY OF THE INVENTION

Accordingly, the present invention is directed to a constant-current driving circuit, wherein the output signal thereof is capable of being optimized in response to different LED strings.

The present invention is also directed to a constant-current driving circuit without generating unwanted heat during operation and with a less efficiency loss than the prior art.

The present invention provides a constant-current driving circuit, which includes a first current source, a reference voltage generating circuit and an output signal generating circuit. A terminal of the first current source is coupled to a terminal of a first LED string, wherein the coupling node of the first current source and the first LED string has a first voltage. The reference voltage generating circuit is employed for generating a reference voltage and comparing the first voltage with a first predetermined voltage to generate a first comparing signal to thereby dynamically adjust the value of the reference voltage. The output signal generating circuit is employed for outputting an output signal to another terminal of the first LED string and receiving an input signal to decide whether or not to output the input signal as the output signal according to the comparison result of the reference voltage with a second voltage.

According to an embodiment of the present invention, the reference voltage generating circuit includes a first comparing circuit and a reference voltage adjusting circuit. The first comparing circuit is employed for comparing the first voltage with the first predetermined voltage to generate a first comparing signal. The reference voltage adjusting circuit is employed for generating a reference voltage and dynamically adjusting the value of the reference voltage according to the first comparing signal.

According to an embodiment of the present invention, the first comparing circuit includes a first comparator, wherein the negative input terminal of the first comparator receives the first voltage, the positive input terminal thereof receives the first predetermined voltage and the output terminal thereof outputs the first comparing signal.

According to an embodiment of the present invention, the reference voltage adjusting circuit includes a second current source, a first switch, a second switch, a third current source and a capacitor. One of the terminals of the second current source is coupled to a power voltage. A terminal of the first switch is coupled to another terminal of the second current source and the on/off state of the first switch is decided by the first comparing signal. One of the terminals of the second switch is coupled to another terminal of the first switch and the on/off state of the second switch is decided by the inverting signal of the first comparing signal. A terminal of the third current source is coupled to another terminal of the second switch, while another terminal of the third current source is coupled to a common voltage level. A terminal of the capacitor is coupled to another terminal of the first switch and outputs a reference voltage, while another terminal of the capacitor is coupled to the common voltage level.

According to an embodiment of the present invention, the constant-current driving circuit sends the output signal to one of terminals of the second LED string. The constant-current driving circuit includes a second current source having a terminal coupled to another terminal of the second LED string, wherein the coupling node of the second current source and the second LED string has a third voltage. The reference voltage generating circuit includes a first comparing circuit, a second comparing circuit and a reference voltage adjusting circuit. The first comparing circuit is employed for comparing a first voltage with a first predetermined voltage to generate a first comparing signal. The second comparing circuit is employed for comparing a third voltage with the first predetermined voltage to generate a second comparing signal. The reference voltage adjusting circuit is employed for generating a reference voltage and dynamically adjusting the value of the reference voltage according to the first comparing signal and the second comparing signal.

According to an embodiment of the present invention, the first comparing circuit includes a first comparator, wherein the negative input terminal of the first comparator receives the first voltage, the positive input terminal thereof receives the first predetermined voltage and the output terminal thereof outputs the first comparing signal. The second comparing circuit includes a second comparator, wherein the negative input terminal of the second comparator receives the third voltage, the positive input terminal thereof receives the first predetermined voltage and the output terminal thereof outputs the second comparing signal.

According to an embodiment of the present invention, the reference voltage adjusting circuit includes an OR gate, a third current source, a first switch, a second switch, a fourth current source and a capacitor. The OR gate is employed for generating an operation output signal according to the first comparing signal and the second comparing signal. A terminal of the third current source is coupled to a power voltage; a terminal of the first switch is coupled to another terminal of the third current source and the on/off state of the first switch is decided by the operation output signal; a terminal of the second switch is coupled to another terminal of the first switch and the on/off state of the second switch is decided by the inverting signal of the operation output signal; a terminal of the fourth current source is coupled to another terminal of the second switch, while another terminal of the fourth current source is coupled to a common voltage level; and a terminal of the capacitor is coupled to another terminal of the first switch and outputs the reference voltage, while another terminal thereof is coupled to the common voltage level.

According to an embodiment of the present invention, the output signal thereof is sent to a terminal of the second LED string, and the constant-current driving circuit further includes a second current source, wherein a terminal of the second current source is coupled to another terminal of the second LED string and the coupling node of the second current source and the second LED string has a third voltage. The reference voltage generating circuit includes a multiplexer, a first comparing circuit and a reference voltage adjusting circuit. The multiplexer is employed for receiving the first voltage and the third voltage and sequentially outputting the first voltage and the third voltage according to a first clock signal. The first comparing circuit is employed for respectively comparing the first voltage and the third voltage with the first predetermined voltage so as to respectively generate a first comparing signal and a second comparing signal. The reference voltage adjusting circuit is employed for generating a reference voltage, receiving and temporally storing the first comparing signal and the second comparing signal, and deciding whether or not to dynamically adjust the value of the reference voltage according to the first comparing signal and the second comparing signal.

According to an embodiment of the present invention, the first comparing circuit includes a first comparator, wherein the negative input terminal of the first comparator receives the output of the multiplexer, the positive input terminal thereof receives the first predetermined voltage and the output terminal thereof outputs the first comparing signal and the second comparing signal.

According to an embodiment of the present invention, the reference voltage adjusting circuit includes a memory unit, an OR gate, a third current source, a first switch, a second switch, a fourth current source and a capacitor. The memory unit is employed for receiving and temporally storing the first comparing signal and the second comparing signal and outputting the first comparing signal and the second comparing signal according to a first clock signal. The OR gate is employed for generating an operation output signal according to the first comparing signal and the second comparing signal. A terminal of the third current source is coupled to a power voltage; a terminal of the first switch is coupled to another terminal of the third current source and the on/off state of the first switch is decided by the operation output signal; a terminal of the second switch is coupled to another terminal of the first switch and the on/off state of the second switch is decided by the inverting signal of the operation output signal; a terminal of the fourth current source is coupled to another terminal of the second switch, while another terminal of the fourth current source is coupled to a common voltage level; and a terminal of the capacitor is coupled to another terminal of the first switch and outputs the reference voltage, while another terminal thereof is coupled to the common voltage level.

According to an embodiment of the present invention, the second voltage is the dividing voltage of a first impedance with a second impedance connected in series with each other. An end of the first impedance receives the output signal, an end of the second impedance is coupled to another end of the first impedance to generate the second voltage, and another end of the second impedance is coupled to another terminal of the first current source.

Since the constant-current driving circuit of the present invention is able to dynamically adjust the reference voltage by using comparing signals generated according to the comparison result of the negative terminal voltage of the LED string with the operation voltages of the current sources connected to the LED string, and then, optimizes the output signal according to the comparison result of the adjusted reference voltage with the above-mentioned impedance dividing voltage, therefore, the constant-current driving circuit of the present invention may not produce any unwanted heat during operation and has less efficiency loss than the conventional circuit.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
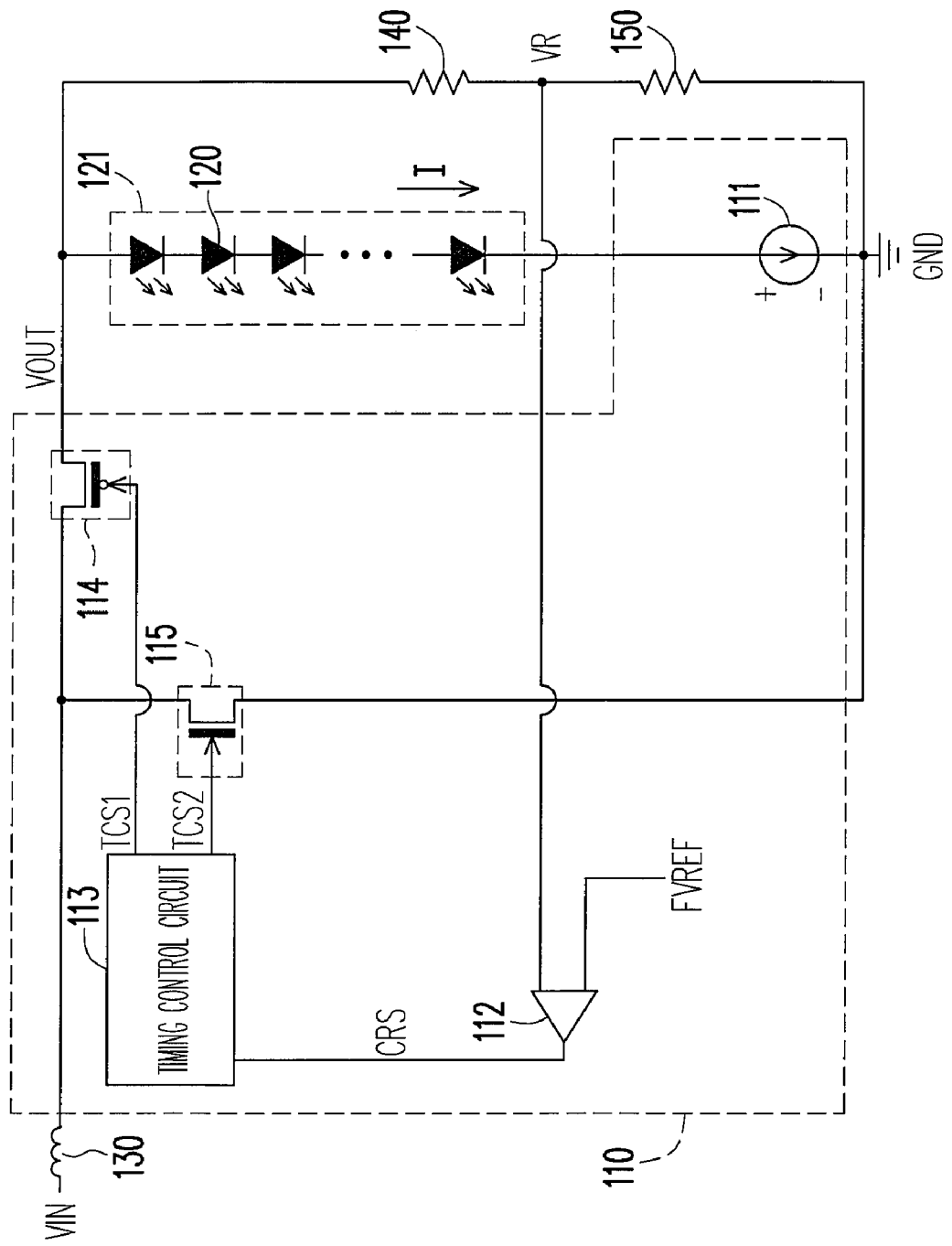
FIG. 1 is a coupling diagram between a conventional constant-current driving circuit and a driven LED string.

Reference will now be made in detail to the present preferred embodiments of the invention, examples of which are illustrated in the accompanying drawings. Wherever possible, the same reference numbers are used in the drawings and the description to refer to the same or like parts.

Figure 2:
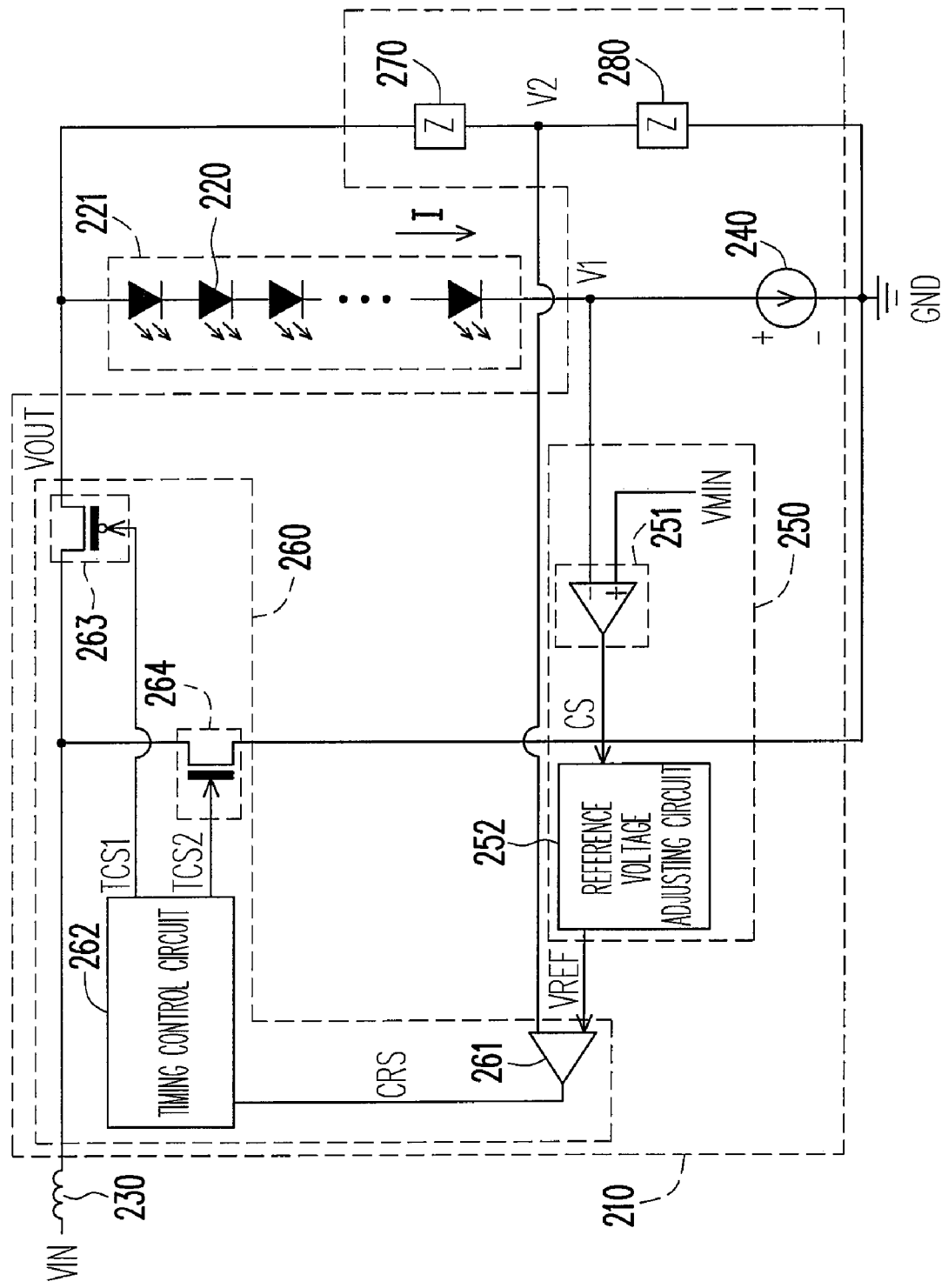
FIG. 2 is a coupling diagram between a constant-current driving circuit and a driven LED string according to an embodiment of the present invention.

FIG. 2 is a coupling diagram between a constant-current driving circuit and a driven LED string according to an embodiment of the present invention. A constant-current driving circuit of the present embodiment in FIG. 2 is notated by 210 for driving an LED string 221 composed of multiple LEDs connected in series 220. The constant-current driving circuit 210 receives an input signal VIN via an inductor 230. The structure of the constant-current driving circuit and the operation of each component are depicted hereinafter.

The constant-current driving circuit 210 includes a current source 240, a reference voltage generating circuit 250, an output signal generating circuit 260 and impedances 270 and 280. The impedances 270 and 280 are used to perform voltage dividing on the output signal VOUT of the constant-current driving circuit 210 so as to obtain a voltage V2 for feedback control. The positive terminal of the current source 240 is coupled to the negative terminal of the LED string 221, the negative terminal of the current source 240 is coupled to a common voltage level GND and the coupling node of the current source 240 and the LED string 221 has a voltage V1. The reference voltage generating circuit 250 is employed for generating a reference voltage VREF and comparing the voltage V1 with a predetermined voltage VMIN so as to generate a comparing signal CS to thereby dynamically adjust the reference voltage VREF, wherein the predetermined voltage VMIN is the operation voltage of the current source 240. The output signal generating circuit 260 is employed for outputting an output signal VOUT to the positive terminal of the LED string 221, receiving an input signal VIN and deciding whether or not to output the input signal VIN as the output signal VOUT according to the comparison result CRS of the reference voltage VREF with the voltage V2.

The reference voltage generating circuit 250 includes a comparing circuit 251 and a reference voltage adjusting circuit 252. The comparing circuit 251 is employed for comparing the voltage V1 with the predetermined voltage VMIN to generate the comparing signal CS. The reference voltage adjusting circuit 252 is employed for generating the reference voltage VREF and dynamically adjusting the reference voltage VREF according to the comparing signal CS.

The output signal generating circuit 260 includes a comparing circuit 261, a timing control circuit 262, switches 263 and 264. The comparing circuit 261 is employed for comparing the reference voltage VREF with the voltage V2 to generate a comparison result VRS. The timing control circuit 262 is employed for generating timing control signals TCS1 and TCS2 according to the comparison result CRS. An terminal of the switch 263 is coupled to the input signal VIN via an inductor 230, while another terminal thereof is coupled to the output terminal of the output signal generating circuit 260, and the on/off state of the switch 263 is decided according to the timing control signal TCS1, wherein the above-mentioned output terminal is employed for outputting the output signal VOUT. An terminal of the switch 264 is coupled to the input signal VIN via the inductor 230, while another terminal thereof is coupled to the common voltage level GND, and the on/off state of the switch 264 is decided according to the timing control signal TCS2.

In the present embodiment, the comparing circuit 251 is implemented by a comparator, where the negative input terminal of the comparator receives the voltage V1, the positive input terminal thereof receives the predetermined voltage VMIN and the output terminal thereof outputs the comparing signal CS. In addition, the switches 263 and 264 can be implemented respectively by a PMOS transistor and an NMOS transistor, where the two source/drains of the PMOS transistor respectively serve as two terminals of the switch 263 and the gate of the PMOS transistor receives the timing control signal TCS1; the two source/drains of the NMOS transistor respectively serve as two terminals of the switch 264 and the gate of the NMOS transistor receives the timing control signal TCS2. The impedances 270 and 280 herein are implemented by resistors.

Figure 3:
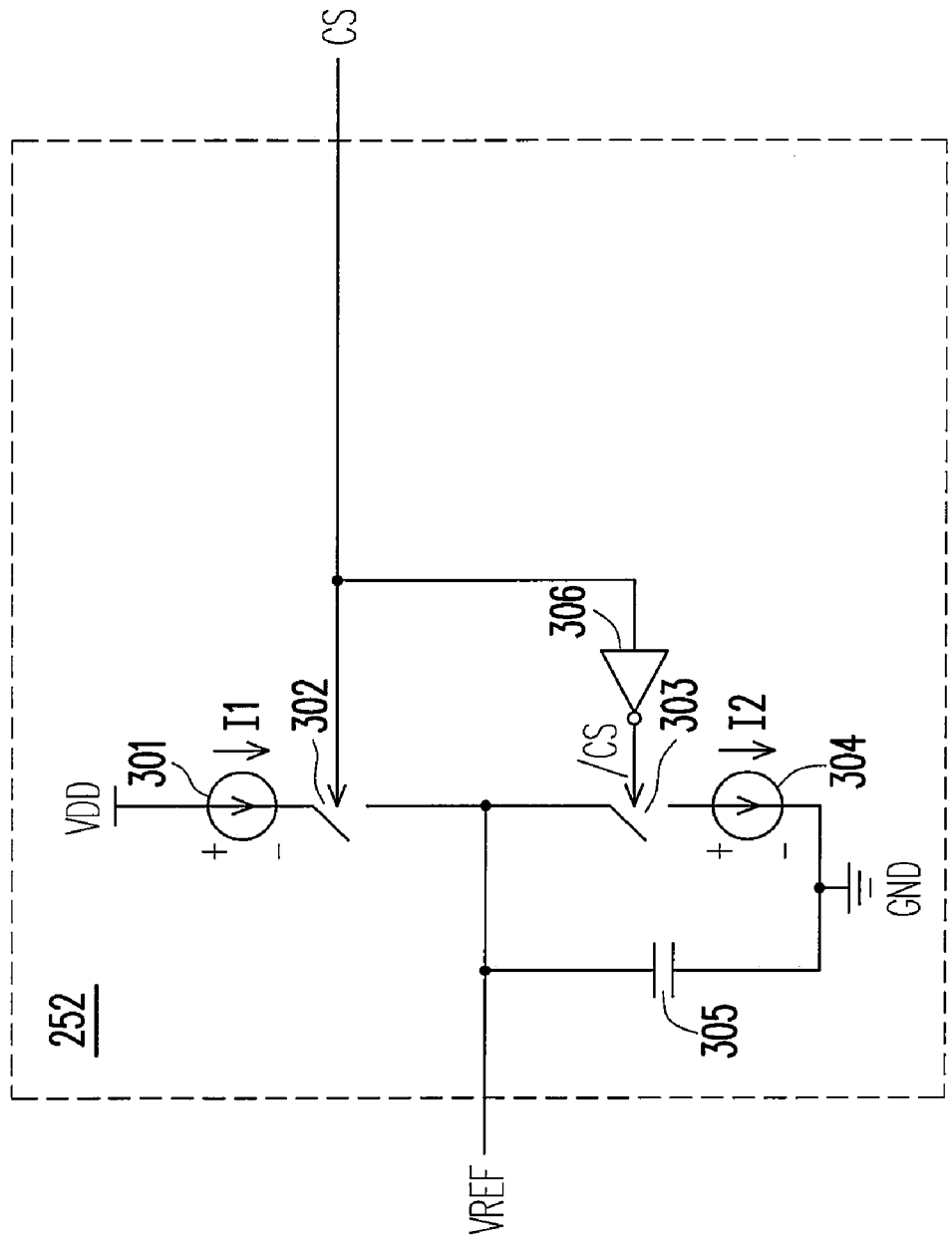
FIG. 3 is a circuit diagram of a reference voltage adjusting circuit 252 shown in FIG. 2.

In the following, the internal structure of the reference voltage adjusting circuit 252 and the detail operation thereof is depicted in more detail. FIG. 3 is a circuit diagram of the reference voltage adjusting circuit 252 of FIG. 2. The reference voltage adjusting circuit 252 includes current sources 301 and 304, switches 302 and 303, a capacitor 305 and an inverter 306. The positive terminal of the current source 301 is coupled to a power voltage VDD. A terminal of the switch 302 is coupled to the negative terminal of the current source 301 and the on/off state of the switch 302 is decided according to the comparing signal CS. A terminal of the switch 303 is coupled to another terminal of the switch 302 and the on/off state of the switch 302 is decided according to the inverting signal /CS of the comparing signal CS. The positive terminal of the current source 304 is coupled to another terminal of the switch 303, while the negative terminal of the current source 304 is coupled to the common voltage level GND. A terminal of the capacitor 305 is coupled to another terminal of the switch 302 and outputs the reference voltage VREF, while another terminal of the capacitor 305 is coupled to the common voltage level GND.

The operation of the constant-current driving circuit 210 is depicted in more detail hereinafter. Referring to FIGS. 2 and 3, when the voltage V1 is greater than the predetermined voltage VMIN which means the voltage drop across the current source 240 is greater than the operation voltage thereof, i.e., the voltage level of the output signal is excessively high, thus, the comparing signal CS at this time exhibits a low-level so as to turn off the switch 302 and turn on the switch 303. As a consequence, a current I2 is drawn by the current source 304 from the capacitor 305 and the capacitor 305 at the time is discharged into the common voltage level GND, and the provided reference voltage VREF drops down. After that, the comparing circuit 261 compares the adjusted reference voltage VREF with the voltage V2 again to generate the comparison result CRS. Further, the timing control circuit 262 generates the timing control signals TCS1 and TCS2 according to the comparison result CRS for respectively controlling the on/off states of the PMOS transistor 263 and the NMOS transistor 264, wherein the voltage level of the output signal VOUT is lowered by controlling the on/off states of the two MOS transistors.

In contrast, when the voltage V1 is less than the predetermined voltage VMIN which means the voltage drop across the current source 240 is lower than the operation voltage thereof, i.e., the voltage level of the output signal is excessively low, thus, the comparing signal CS at the time exhibits a high-level so as to turn on the switch 302 and turn off the switch 303. As a consequence, the current source 301 is able to provide a current I1 to charge and the reference voltage VREF provided by the capacitor 305 is raised. After that, the comparing circuit 261 compares the adjusted reference voltage VREF with the voltage V2 again to generate the comparison result CRS. Further, the timing control circuit 262 generates the timing control signals TCS1 and TCS2 according to the comparison result CRS for respectively controlling the on/off states of the PMOS transistor 263 and the NMOS transistor 264, wherein the voltage level of the output signal VOUT is increased by controlling the on/off states of the two MOS transistors.

It can be seen from the above description, the output signal VOUT is a floating voltage and can be decided by the following formula (2):

$$VOUT = VREF \times ((R1+R2)/R2) \qquad (2)$$

wherein R1 and R2 respectively represent the resistance of the impedances 270 and 280. Although the level of the reference voltage VREF is varied with that whether or not the voltage drop across the current source 240 reaches the required minimum operation voltage (i.e. the predetermined voltage VMIN), however, if the voltage drop across the current source 240 is less than the operation voltage thereof, the reference voltage VREF would be increased; otherwise, the reference voltage VREF would be decreased. Therefore, in terms of an average effect, the voltage drop across the current source 240 would be automatically adjusted to be close to the operation voltage thereof, while the output signal VOUT would be automatically adjusted to be close to VMIN+N×VF, wherein N is the number of the LEDs 220 in the LED string 221 and VF is the forward bias voltage of the single LED 220.

Besides, the reference voltage VREF would be automatically adjusted to (VMIN+N×VF)×R2/(R1+R2) as well. In the architecture, the impedances 270 and 280 are fixed values, thus, if the constant-current driving circuit 210 is an integrated circuit (IC), the impedances 270 and 280 can be built in the IC. The circuit architecture is able to optimize the output signal VOUT in spite of the differences of the LED string 221 or the current value I, which makes the highest system efficiency possible and avoids generation of any unwanted heat. In addition, regardless of the charging current I1 or discharging current I2, the current values thereof need to be calculated to prevent the output signal generating circuit 260 from failing to respond in time when the reference voltage VREF experiences a too quick transition.

Figure 4:
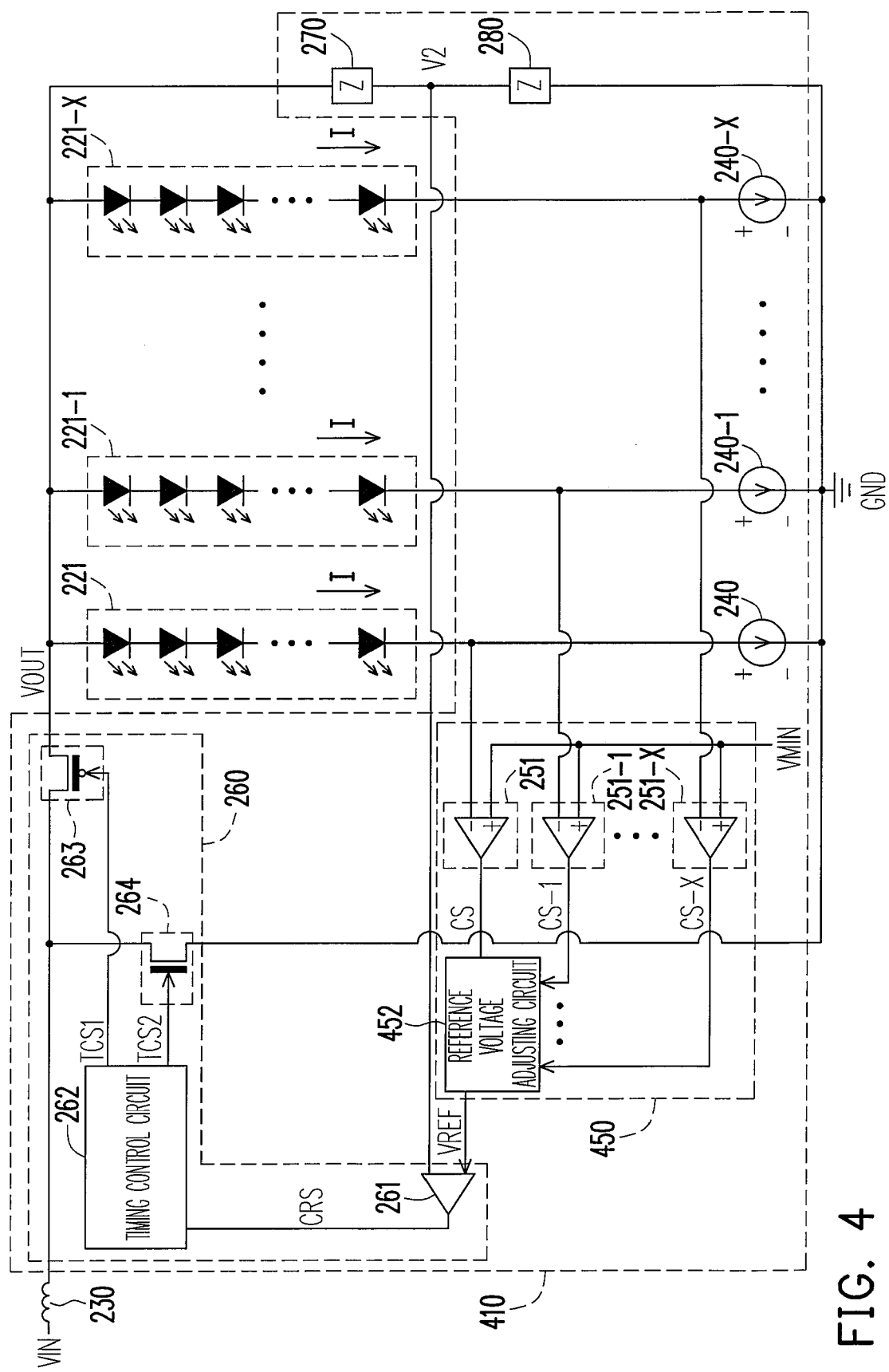
FIG. 4 is a coupling diagram between a constant-current driving circuit and a driven multiple LED strings according to an embodiment of the present invention.

According to the above description, the constant-current driving circuit 210 of the present invention can simultaneously drive a plurality of LED strings by an appropriate modification thereon. FIG. 4 is a coupling diagram between a constant-current driving circuit and a driven multiple LED strings according to an embodiment of the present invention. Referring to FIG. 4, a constant-current driving circuit 410 of the present embodiment is employed for driving an LED string 221 and LED strings 221-1~221-X.

Referring to FIGS. 2 and 4, differently from FIG. 2, the constant-current driving circuit 410 in FIG. 4 employs current sources 240-1~240-X respectively corresponding to the LED strings 221-1~221-X. In addition, the reference voltage generating circuit 450 in the constant-current driving circuit 410 also employs comparing circuits 251-1~251-X respectively corresponding to the LED strings 221-1~221-X. Since the comparing circuits 251-1~251-X also output comparing signals CS-1~CS-X, thus, the internal circuit of the reference voltage adjusting circuit 452 must be modified accordingly, so as to adjust the reference signal VREF according to the comparing signal CS and the comparing signals CS-1~CS-X.

Figure 5:
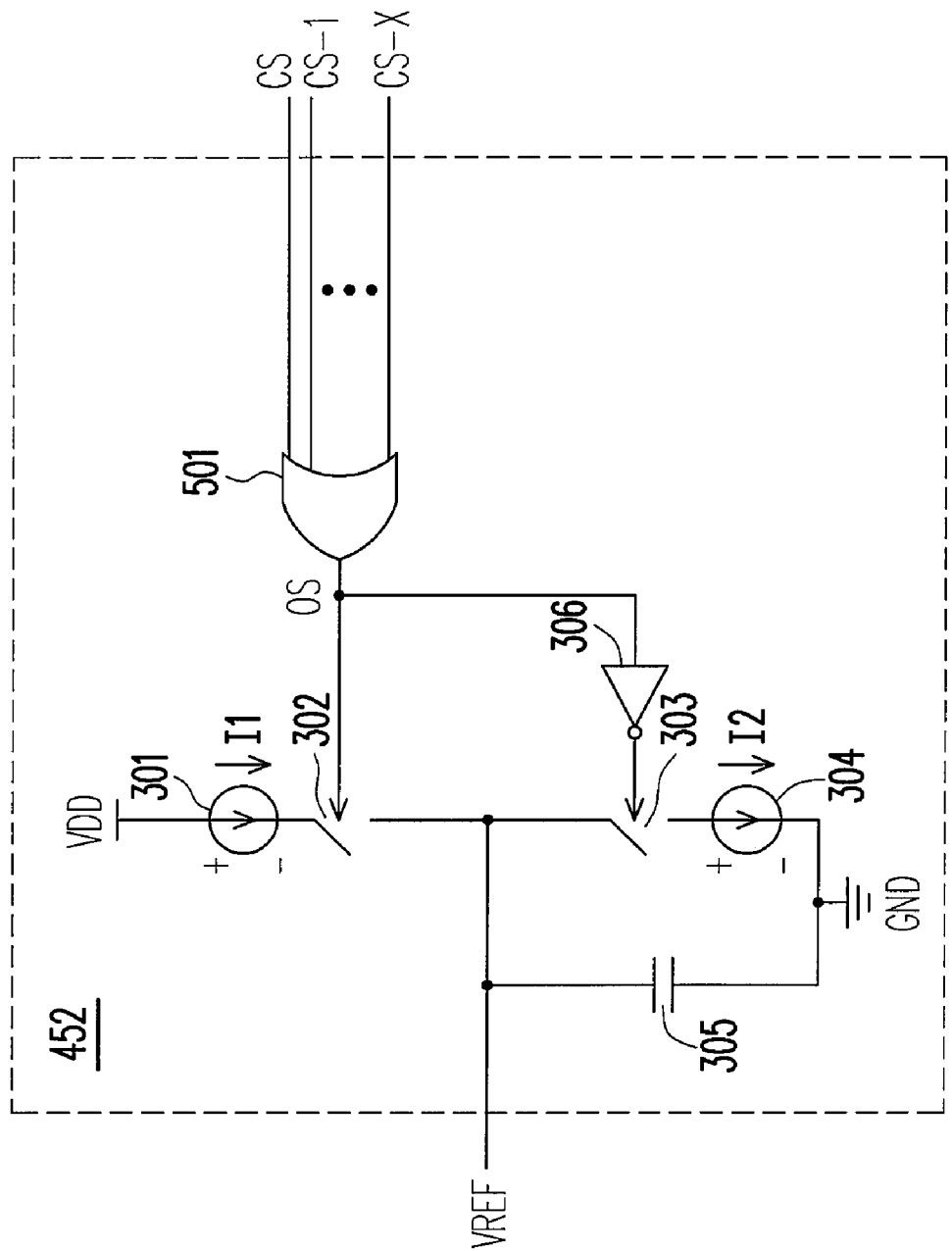
FIG. 5 is a circuit diagram of a reference voltage adjusting circuit 452 shown in FIG. 4.

FIG. 5 is a circuit diagram of the reference voltage adjusting circuit 452 shown in FIG. 4. Referring to FIGS. 3 and 5, differently from FIG. 3, the reference voltage adjusting circuit 452 in FIG. 5 has an extra OR gate 501 for generating an operation output signal OS according to the comparing signal CS and the comparing signals CS-1~CS-X. In this way, the reference voltage adjusting circuit 452 is able to adjust the operation output signal OS.

It can be seen from the above description that if all the outputs of the comparing circuits take low-level, it means the voltage drops across the current source 240 and across all current sources 240-1~240-X exceed the operation voltages thereof. At this time, the reference voltage adjusting circuit 452 would lower the reference signal VREF, so as to make the output signal VOUT of the constant-current driving circuit 410 drop down accordingly. In contrast, if the output of any one of the comparing circuits is at a high-level, it means the voltage drop across one of the current sources 240 and 240-1~240-X is less than the operation voltage thereof. At this time, the reference voltage adjusting circuit 452 would increase the reference signal VREF, so as to make the output signal VOUT of the constant-current driving circuit 410 rise accordingly.

Figure 6:
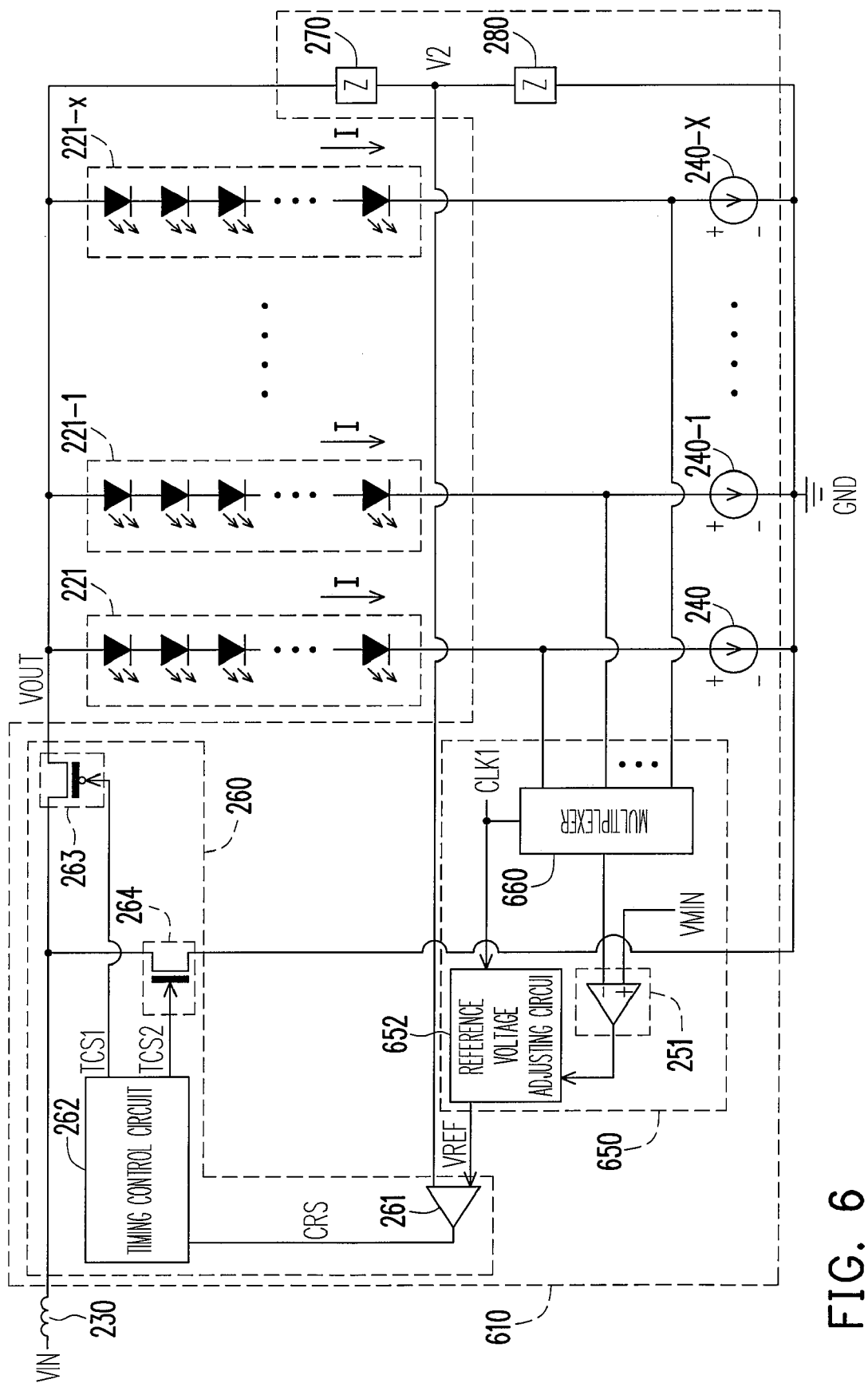
FIG. 6 is a coupling diagram between a constant-current driving circuit and a driven multiple LED strings according to another embodiment of the present invention.

The constant-current driving circuit 210 may have another modified implementation, which may be employed to drive multiple LED strings and does not require to employ a comparing circuit in the reference voltage generating circuit 250, as shown by FIG. 6. FIG. 6 is a coupling diagram between a constant-current driving circuit and a driven multiple LED strings according to another embodiment of the present invention. The constant-current driving circuit 610 according to an embodiment of the present invention in FIG. 6 is employed for driving the LED string 221 and the LED strings 221-1~221-X.

Referring to FIGS. 4 and 6, differently from FIG. 4, the reference voltage generating circuit 650 in FIG. 6 is coupled to the negative terminals of all the LED strings through a multiplexer 660 and sequentially outputs a received negative terminal voltage according to a clock signal CLK. In this way, once the comparing circuit 251 sequentially compares the negative terminal voltage output from the multiplexer 660 with a predetermined voltage VMIN, and the obtained comparing signal is sent to the reference voltage adjusting circuit 652. In order to associate with the operation of the multiplexer 660, the reference voltage adjusting circuit 652 is also operated according to a clock signal CLK1. Thus, a minor modification for implementing the reference voltage adjusting circuit 652 is needed.

Figure 7:
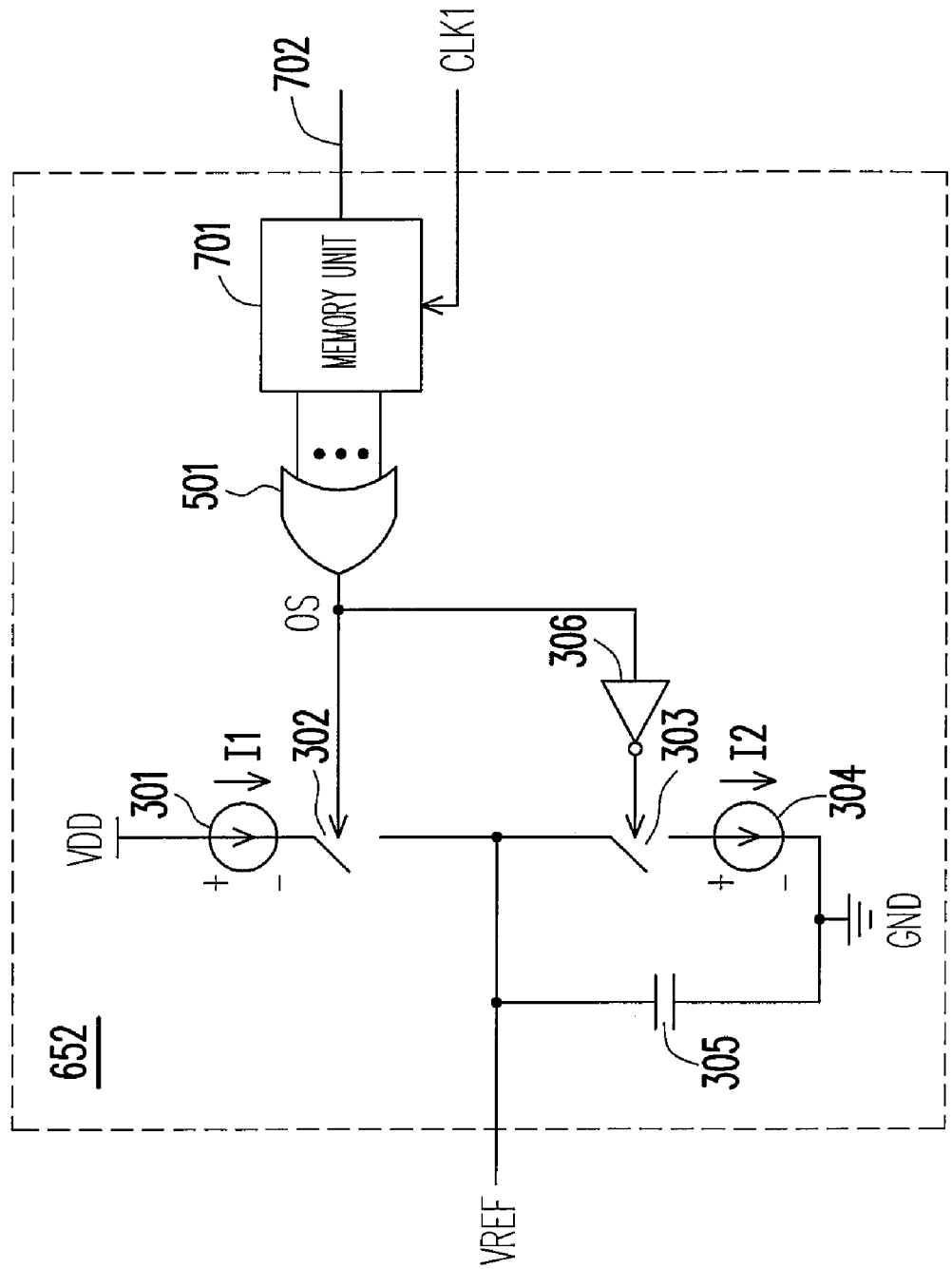
FIG. 7 is a circuit diagram of a reference voltage adjusting circuit 652 shown in FIG. 6.

FIG. 7 is a circuit diagram of the reference voltage adjusting circuit 652 shown in FIG. 6. Referring to FIGS. 5 and 7, differently from FIG. 5, the reference voltage adjusting circuit 652 shown by FIG. 7 has an extra memory unit 701, wherein the input terminal 702 of the memory unit 701 is coupled to the output of the comparing circuit 251 for receiving and temporarily storing the comparing signals sequentially sent by the comparing circuit 251 and then sending all the received comparing signals to the OR gate 501 according to the clock signal CLK1 to generate an operation output signal OS. Thus, the reference voltage adjusting circuit 652 is able to adjust the reference signal VREF according to the operation output signal OS.

Since all the reference voltage adjusting circuits in the above-described embodiments are implemented in charge pump scheme, thus, all the reference voltage adjusting circuits employ a capacitor. These capacitors have quite large capacitance so that the capacitors are unable to be integrated into an IC. In order to integrate the capacitor into an IC, the required capacitance must be lowered, which can be resolved by providing a clock signal with a very low frequency sent to the reference voltage adjusting circuit. The reference voltage adjusting circuit decides whether or not to change the reference signal VREF by using the clock signal with a very low frequency as shown by FIG. 8.

Figure 8:
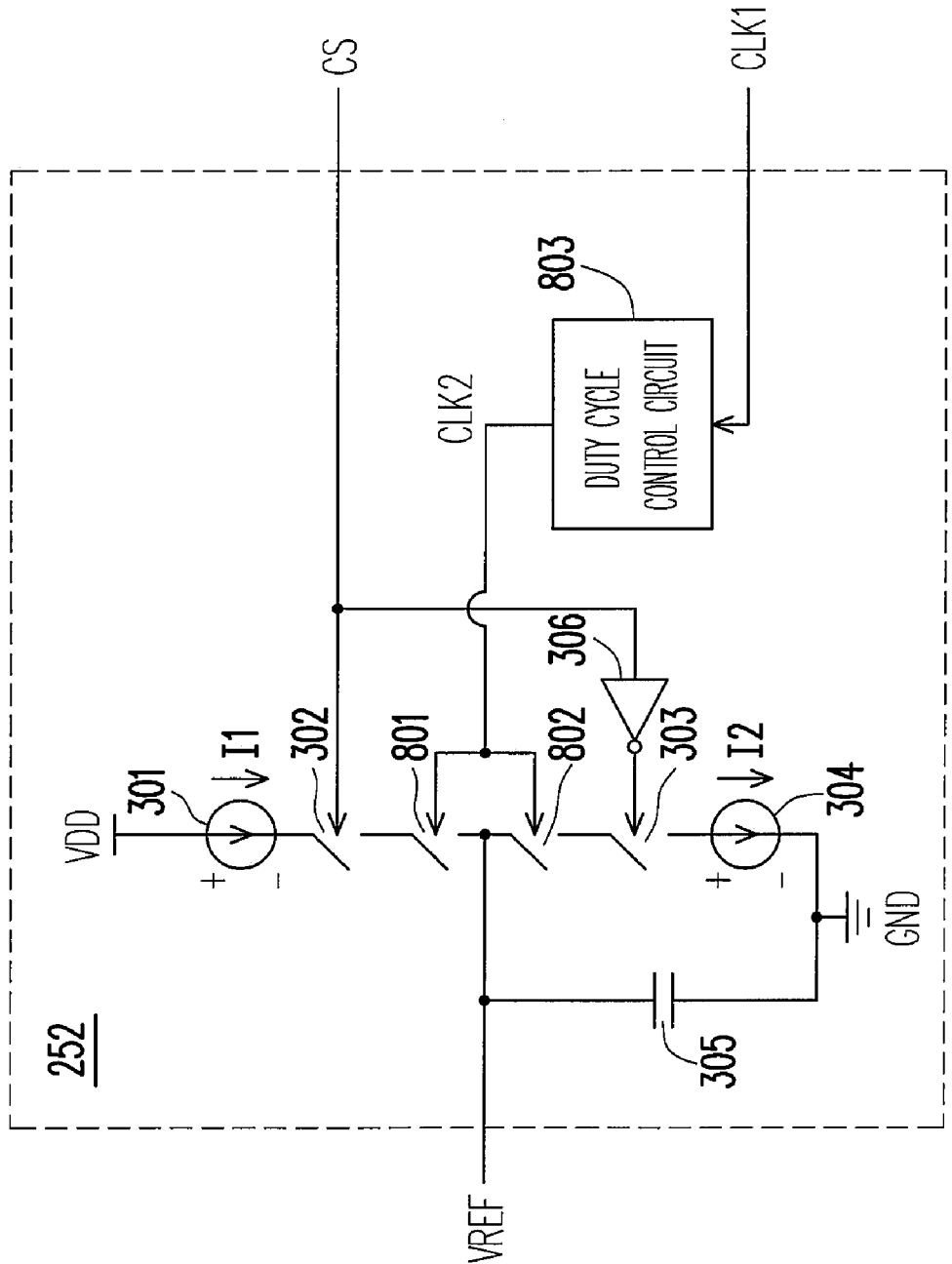
FIG. 8 is another implementation circuit diagram of the reference voltage adjusting circuit 252 of FIG. 2.
Figure 9:
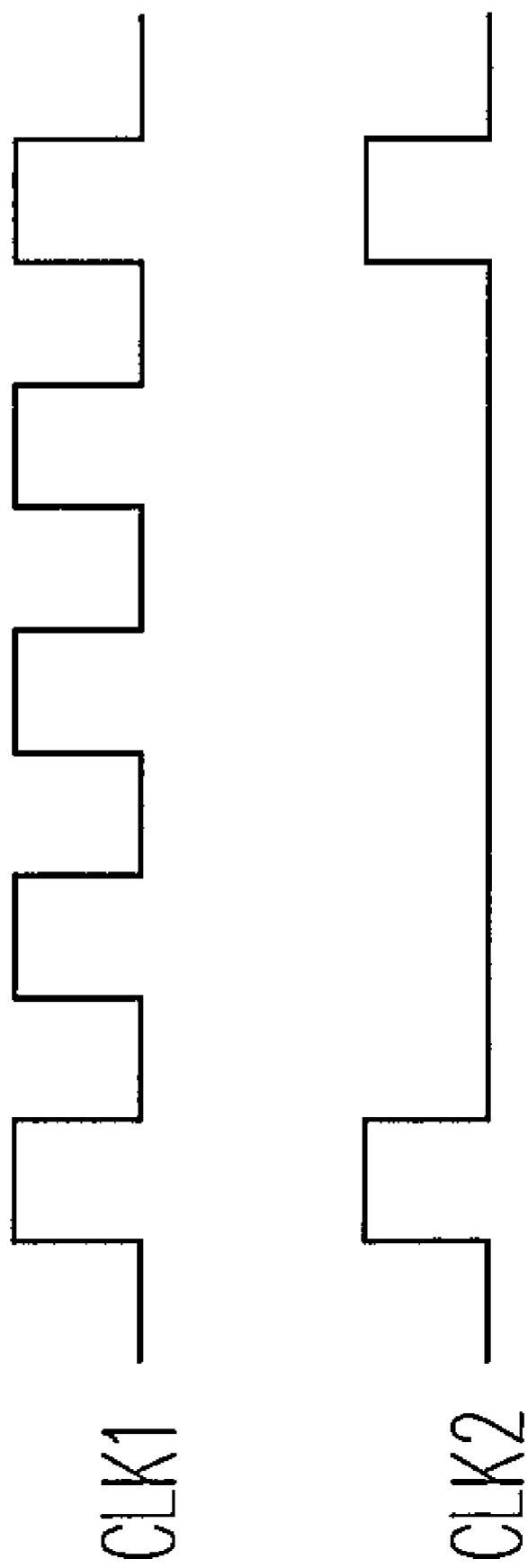
FIG. 9 is a diagram showing clock signals CLK1 and CLK2.

FIG. 8 is another implementation circuit diagram of the reference voltage adjusting circuit 252 of FIG. 2 Referring to FIGS. 3 and 8, in comparison with FIG. 3, the reference voltage adjusting circuit 252 in FIG. 8 employs additional switches 801 and 802 and a duty cycle control circuit 803. The duty cycle control circuit 803 generates a clock signal CLK2 with a very low frequency according to the clock signal CLK1. The duty cycle of the clock signal CLK2 is less than that of the clock signal CLK1, as shown by FIG. 9. FIG. 9 is a diagram showing clock signals CLK1 and CLK2. The on/off states of the switches 801 and 802 are decided by the clock signal CLK2. When the clock signal CLK2 is at a high-level, both the switches 801 and 802 are turned on; at this time, the reference voltage adjusting circuit 252 can adjust the reference signal VREF. In contrast, when the clock signal CLK2 is at a low-level, both the switches 801 and 802 are turned off, at this time, the reference signal VREF remains unchanged.

In addition, the clock signal CLK1 can be either an external clock signal, or a clock signal inside the constant-current driving circuit 210. Similarly, the user can also directly provide an external clock signal CLK2, so that there is no need to employ the duty cycle control circuit 803 inside the reference voltage adjusting circuit 252.

Figure 10:
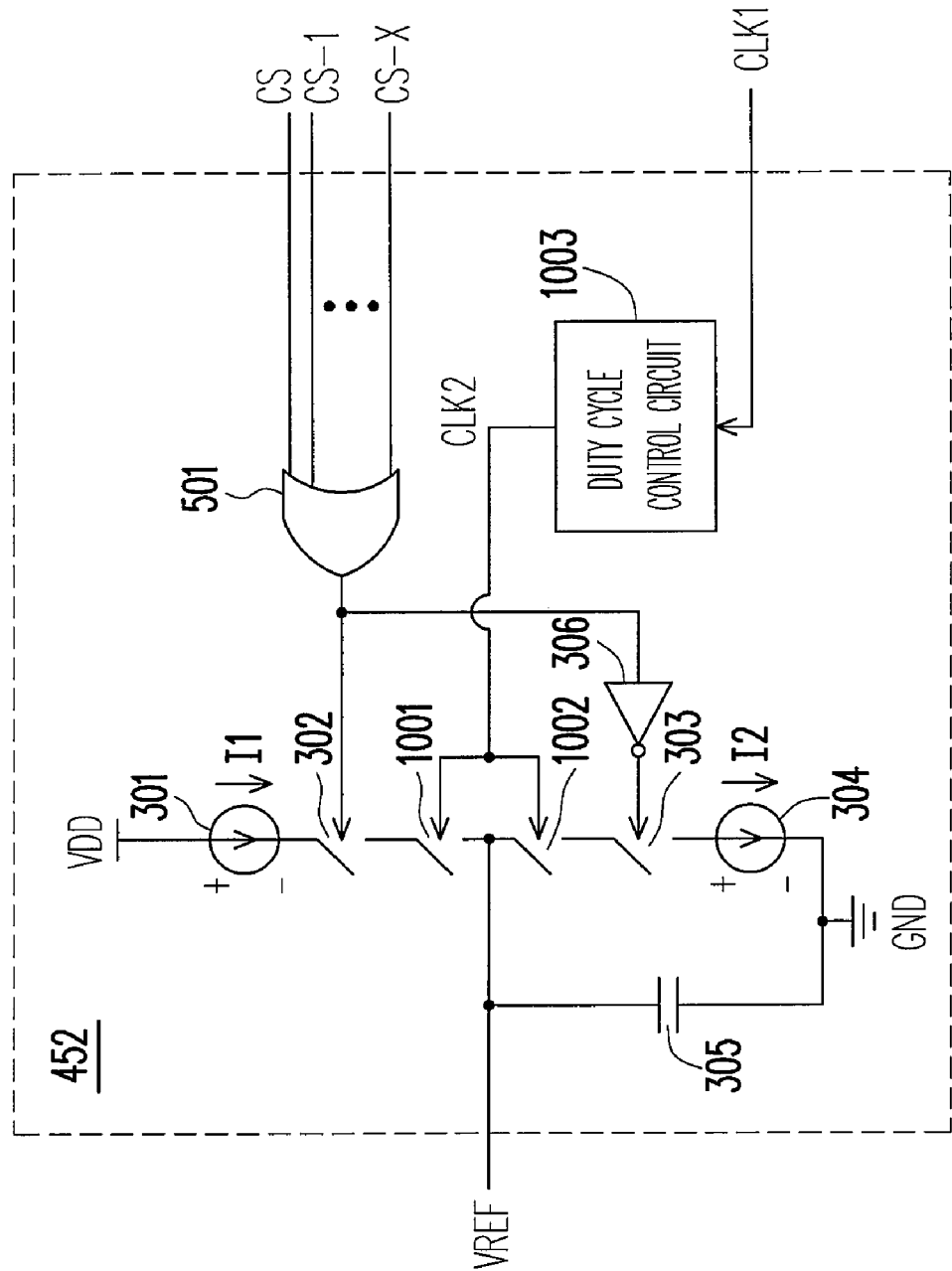
FIG. 10 is another implementation circuit diagram of the reference voltage adjusting circuit 452 of FIG. 4.
Figure 11:
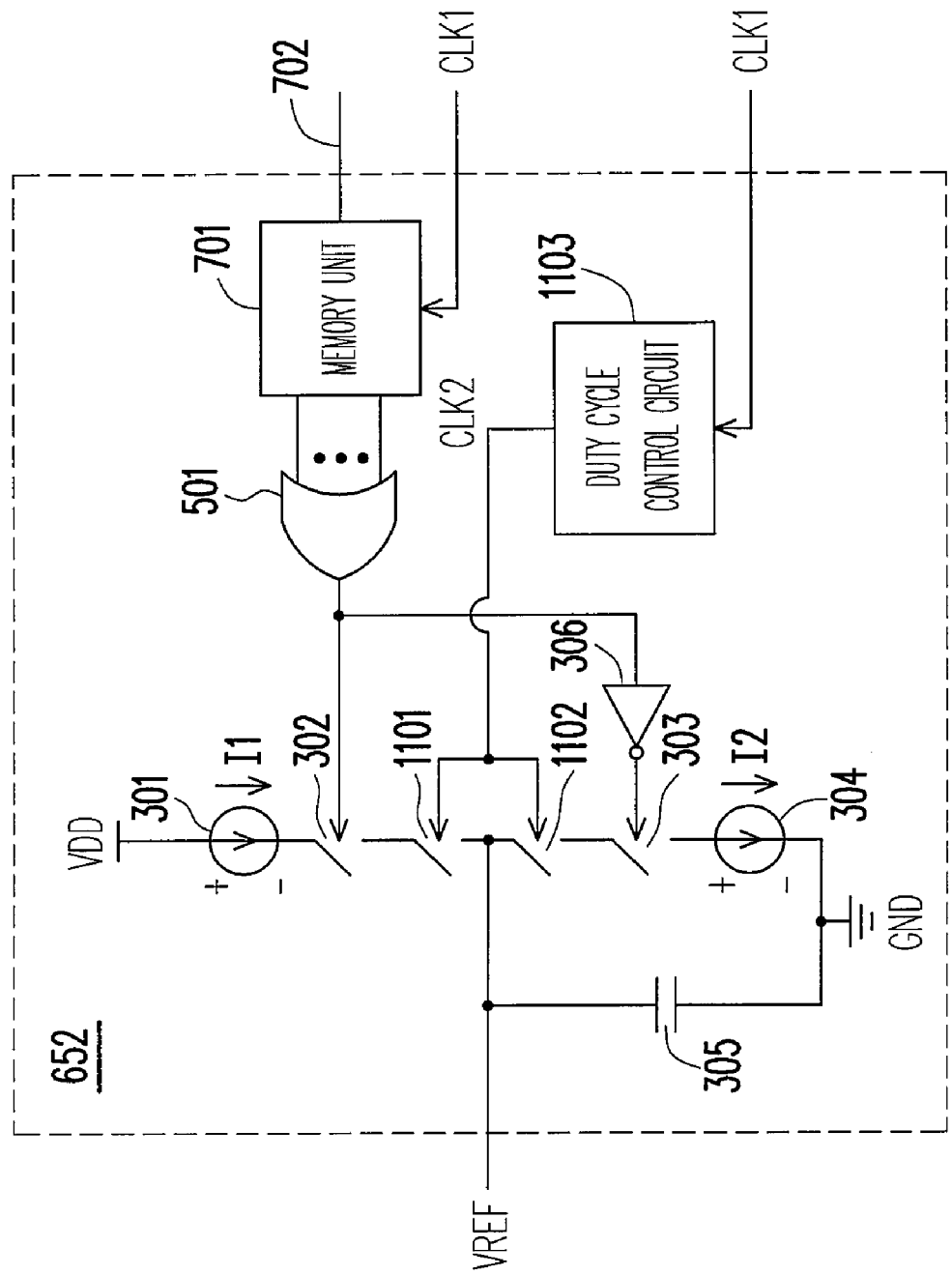
FIG. 11 is another implementation circuit diagram of the reference voltage adjusting circuit 652 of FIG. 6.

The reference voltage adjusting circuit 452 in FIG. 4 can be implemented by using the above-described modification scheme. FIG. 10 is another implementation circuit diagram of the reference voltage adjusting circuit 452 of FIG. 4. Referring to FIGS. 5 and 10, differently from FIG. 5, the circuit of FIG. 10 employs additional switches 1001 and 1002 and a duty cycle control circuit 1003. The reference voltage adjusting circuit 652 in FIG. 6 can be implemented by using the above-described modification scheme. FIG. 11 is another implementation circuit diagram of the reference voltage adjusting circuit 652 of FIG. 6. Referring to FIGS. 7 and 11, differently from FIG. 7 the circuit of FIG. 11 employs additional switches 1101 and 1102 and a duty cycle control circuit 1103.

Note that the above-mentioned reference voltage generating circuit is able to monitor the negative terminal voltage of the LED string for whether or not the negative terminal voltage reaches the operation voltage of the current source connected to the reference voltage generating circuit to thereby adjust the reference signal VREF. However, if no hysteresis interval is found in the above-mentioned negative terminal voltage by using the comparing circuit in the reference voltage generating circuit to monitor the negative terminal voltage, the voltage drop across the current source connected to the LED string would keep fluctuating around the level of the predetermined voltage VMIN. Meanwhile, the output signal VOUT fluctuates resulting in increasing ripple components, modulates the current in a storage inductor 230 and increases the current ripple components. To improve this phenomena, a hysteresis interval is added into the comparing circuit in the reference voltage generating circuit. For depiction convenience, the reference voltage generating circuit required by the circuit of FIG. 2 is taken as an example for explaining the above-mentioned improvement method, as shown by FIG. 12.

Figure 12:
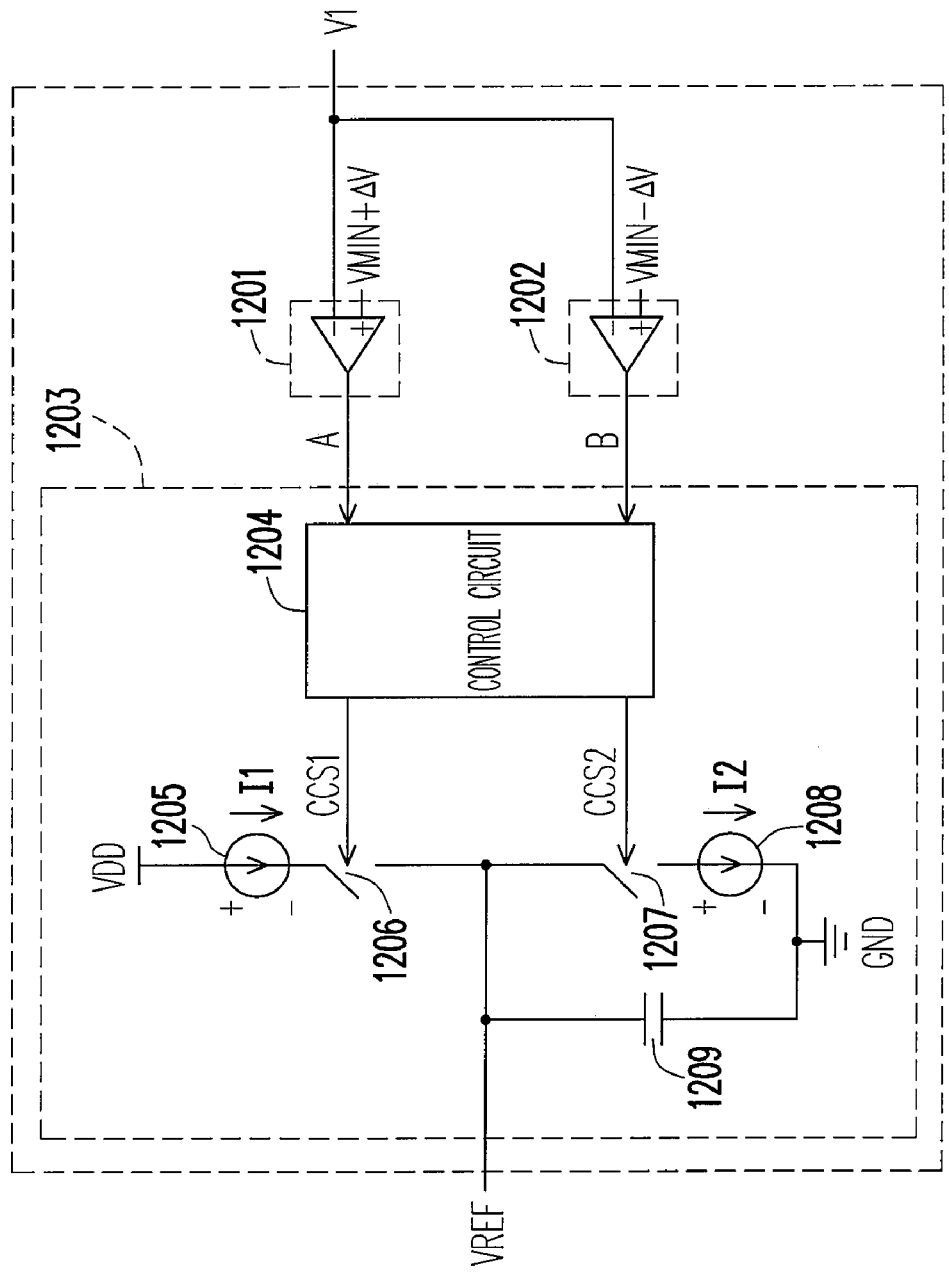
FIG. 12 is another implementation circuit diagram of the reference voltage generating circuit 250 of FIG. 2.

FIG. 12 is another implementation circuit diagram of the reference voltage generating circuit 250 of FIG. 2. The reference voltage generating circuit of FIG. 12 includes comparing circuits 1201 and 1202 and a reference voltage adjusting circuit 1203, wherein the reference voltage adjusting circuit 1203 includes a control circuit 1204, current sources 1205 and 1208, switches 1206 and 1207 and a capacitor 1209. In the present embodiment, the comparing circuits 1201 and 1202 are implemented by comparators. Referring to FIGS. 2 and 12, the negative input terminal of the comparing circuit 1201 receives a voltage V1, the positive input terminal thereof receives a predetermined voltage VMIN+$\Delta$V for thereby generating a comparing signal A, wherein the predetermined voltage VMIN is the operation voltage of the current source 240, and $\Delta$V is also a predetermined voltage less than the operation voltage of the current source 240. The negative input terminal of the comparing circuit 1202 also receives the voltage V1, the positive input terminal thereof receives a predetermined voltage VMIN+$\Delta$V for thereby generating a comparing signal B.

The control circuit 1204 is employed for receiving the comparing signals A and B. When both the comparing signals A and B are at a high-level, that is, the voltage drop across the current source 240 is less than the predetermined voltage VMIN+$\Delta$V, the control circuit 1204 outputs a control signal CCS1 to turn on the switch 1206, which would raise the reference signal VREF and accordingly raise the output signal VOUT. In contrast, when both the comparing signals A and B are at a low-level, that is, the voltage drop across the current source 240 is greater than the predetermined voltage VMIN+$\Delta$V, the control circuit 1204 outputs a control signal CCS2 to turn on the switch 1207, which would lower the reference signal VREF and accordingly lower the output signal VOUT. When the comparing signal A takes a high-level and the comparing signal B takes a low-level, that is, the voltage drop across the current source 240 is between the predetermined voltages VMIN+$\Delta$V and VMIN−$\Delta$V, the control circuit 1204 does not output any signal, which would keep the reference signal VREF unchanged. In this way, the ripple current caused by the output signal VOUT and the current of the storage inductor 230 can be reduced.

Note that although in the above-described embodiments, the load of the constant-current driving circuit is LED strings composed of LEDs, but the present invention does not limit the applicable load to LED strings as such.

In summary, since the constant-current driving circuit of the present invention compares the negative terminal voltage of the LED strings with the operation voltage of the current source connected to the constant-current driving circuit to generate a comparing signal, uses the comparing signal to dynamically adjust the reference voltage and then compares the adjusted reference voltage with the above-mentioned impedance dividing voltage so as to optimize the output signal according to the comparison result, therefore, the constant-current driving circuit of the present invention does not generate any unwanted heat during operation and has a less efficiency loss compared to the conventional circuit.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents. In addition, any one of the embodiments of the present invention or any one of the claims is not necessarily to achieve all the objectives, all the advantages or all the features disclosed by the present invention. Moreover, the abstract of the disclosure and the title are intended to aid paten searching, not to limit the claim scope of the present invention.

What is claimed is:

1. A constant-current driving circuit, for driving a first LED string, comprising:
   a first current source having a terminal coupled to a terminal of the first LED string, wherein a coupling node of the first current source and the first LED string has a first voltage;
   a reference voltage generating circuit, for generating a reference voltage and comparing the first voltage with a first predetermined voltage to generate a first comparing signal and thereby dynamically adjust the reference voltage; and
   an output signal generating circuit, for outputting an output signal to another terminal of the first LED string, wherein the output signal generating circuit receives an input signal and decides whether or not to output the input signal according to a comparison result between the reference voltage and a second voltage,
   wherein the second voltage is a dividing voltage of a first impedance and a second impedance connected in series; an end of the first impedance receives the output signal; an end of the second impedance is coupled to another end of the first impedance for generating the second voltage and another end of the second impedance is coupled to another end of the first current source.

2. The constant-current driving circuit according to claim 1, wherein the reference voltage generating circuit comprises:
   a first comparing circuit for comparing the first voltage with the first predetermined voltage to generate the first comparing signal; and
   a reference voltage adjusting circuit for generating the reference voltage and dynamically adjusting the reference voltage according to the first comparing signal.

3. The constant-current driving circuit according to claim 2, wherein the first comparing circuit comprises:
   a first comparator having a negative input terminal receiving the first voltage, a positive input terminal receiving the first predetermined voltage and an output terminal for outputting the first comparing signal.

4. The constant-current driving circuit according to claim 3, wherein the reference voltage adjusting circuit comprises:
   a second current source, having a terminal coupled to a power voltage;
   a first switch, having a terminal coupled to another terminal of the second current source, wherein on/off state of the first switch is decided according to the first comparing signal;
   a second switch, having a terminal coupled to another terminal of the first switch, wherein on/off state of the second switch is decided according to the inverting signal of the first comparing signal;
   a third current source, having a terminal coupled to another terminal of the second switch and another terminal coupled to a common voltage level; and
   a capacitor, having a terminal coupled to another terminal of the first switch for outputting the reference voltage and another terminal coupled to the common voltage level.

5. The constant-current driving circuit according to claim 4, wherein the reference voltage adjusting circuit further comprises:
   an inverter for receiving the first comparing signal and thereby outputting the inverting signal of the first comparing signal.

6. The constant-current driving circuit according to claim 2, wherein the reference voltage adjusting circuit decides whether or not to dynamically adjusts the reference voltage based on the first comparing signal according to a first clock signal.

7. The constant-current driving circuit according to claim 6, wherein the first comparing circuit comprises:
   a first comparator, having a negative input terminal for receiving the first voltage, a positive input terminal for receiving the first predetermined voltage and an output terminal for outputting the first comparing signal.

8. The constant-current driving circuit according to claim 7, wherein the reference voltage adjusting circuit comprises:
   a second current source, having a terminal coupled to a power voltage;
   a first switch, having a terminal coupled to another terminal of the second current source, wherein on/off state of the first switch is decided according to the first comparing signal;
   a second switch, having a terminal coupled to another terminal of the first switch, wherein on/off state of the second switch is decided according to the first clock signal;
   a third switch, having a terminal coupled to another terminal of the second switch, wherein on/off state of the third switch is decided according to the first clock signal;
   a fourth switch, having a terminal coupled to another terminal of the third switch, wherein on/off state of the fourth switch is decided according to the inverting signal of the first comparing signal;
   a third current source, having a terminal coupled to another terminal of the fourth switch and another terminal coupled to a common voltage level; and
   a capacitor, having a terminal coupled to another terminal of the fourth switch for outputting the reference voltage and another terminal coupled to the common voltage level.

9. The constant-current driving circuit according to claim 8, wherein the reference voltage adjusting circuit further comprises:
   a duty cycle control circuit for generating the first clock signal according to a second clock signal, wherein the duty cycle of the first clock signal is less than the duty cycle of the second clock signal.

10. The constant-current driving circuit according to claim 1, wherein the first impedance and the second impedance respectively comprise a resistor.

11. The constant-current driving circuit according to claim 1, further comprising the first impedance and the second impedance.

12. The constant-current driving circuit according to claim 1, wherein the output signal generating circuit further receives the input signal via an inductor.

13. The constant-current driving circuit according to claim 1, wherein the first predetermined voltage is the operation voltage of the first current source.

14. The constant-current driving circuit according to claim 1, wherein the first LED string is formed by a plurality of LEDs connected in series.

15. A constant-current driving circuit, for driving a first LED string, the constant-current driving circuit comprising:
   a first current source having a terminal coupled to a terminal of the first LED string, wherein a coupling node of the first current source and the first LED string has a first voltage;
   a reference voltage generating circuit, for generating a reference voltage and comparing the first voltage with a first predetermined voltage to generate a first comparing signal and thereby dynamically adjust the reference voltage; and
   an output signal generating circuit, for outputting an output signal to another terminal of the first LED string, wherein the output signal generating circuit receives an input signal and decides whether or not to output the input signal according to a comparison result between the reference voltage and a second voltage,
   wherein the constant-current driving circuit further outputs the output signal to a terminal of a second LED string; the constant-current driving circuit further comprises a second current source, wherein a terminal of the second current source is coupled to another terminal of the second LED string, the coupling node of the second current source and the second LED string has a third voltage; the reference voltage generating circuit also compares the third voltage with the first predetermined voltage to generate a second comparing signal, and dynamically adjusts the reference voltage according to the first comparing signal and the second comparing signal.

16. The constant-current driving circuit according to claim 15, wherein the reference voltage generating circuit comprises:
   a first comparing circuit for comparing the first voltage with the first predetermined voltage to generate the first comparing signal;
   a second comparing circuit for comparing the third voltage with the first predetermined voltage to generate the second comparing signal; and
   a reference voltage adjusting circuit for generating the reference voltage and dynamically adjusting the reference voltage according to the first comparing signal and the second comparing signal.

17. The constant-current driving circuit according to claim 16, wherein the first comparing circuit comprises a first comparator having a negative input terminal for receiving the first voltage, a positive input terminal for receiving the first predetermined voltage and an output terminal for outputting the first comparing signal; the second comparing circuit comprises a second comparator having a negative input terminal for receiving the third voltage, a positive input terminal for receiving the first predetermined voltage and an output terminal for outputting the second comparing signal.

18. The constant-current driving circuit according to claim 17, wherein the reference voltage adjusting circuit comprises:
   an OR gate for generating an operation output signal according to the first comparing signal and the second comparing signal;
   a third current source having a terminal coupled to a power voltage;
   a first switch having a terminal coupled to another terminal of the third current source, wherein on/off state of the first switch is decided according to the operation output signal;
   a second switch having a terminal coupled to another terminal of the first switch, wherein on/off state of the second switch is decided according to the inverting signal of the operation output signal;
   a fourth current source having a terminal coupled to another terminal of the second switch and another terminal coupled to a common voltage level; and
   a capacitor, having a terminal coupled to another terminal of the first switch for outputting the reference voltage and another terminal coupled to the common voltage level.

19. The constant-current driving circuit according to claim 18, wherein the reference voltage adjusting circuit further comprises:
   an inverter for receiving the operation output signal and thereby outputting the inverting signal of the operation output signal.

20. The constant-current driving circuit according to claim 16, wherein the reference voltage adjusting circuit further decides whether or not to dynamically adjusts the reference voltage based on the first comparing signal and the second comparing signal according to a first clock signal.

21. The constant-current driving circuit according to claim 20, wherein the first comparing circuit comprises a first comparator having a negative input terminal for receiving the first voltage, a positive input terminal for receiving the first predetermined voltage and an output terminal for outputting the first comparing signal; and the second comparing circuit comprises a second comparator having a negative input terminal for receiving the third voltage, a positive input terminal for receiving the first predetermined voltage and an output terminal for outputting the second comparing signal.

22. The constant-current driving circuit according to claim 21, wherein the reference voltage adjusting circuit comprises:
   an OR gate for generating an operation output signal according to the first comparing signal and the second comparing signal;
   a third current source having a terminal coupled to a power voltage;
   a first switch having a terminal coupled to another terminal of the third current source, wherein on/off state of the first switch is decided according to the operation output signal;
   a second switch having a terminal coupled to another terminal of the first switch, wherein on/off state of the second switch is decided according to the first clock signal;
   a third switch having a terminal coupled to another terminal of the second switch, wherein on/off state of the third switch is decided according to the first clock signal;
   a fourth switch having a terminal coupled to another terminal of the third switch, wherein on/off state of the fourth switch is decided according to the inverting signal of the operation output signal;
   a fourth current source having a terminal coupled to another terminal of the fourth switch and another terminal coupled to a common voltage level; and
   a capacitor having a terminal coupled to another terminal of the second switch for outputting the reference voltage and another terminal coupled to the common voltage level.

23. The constant-current driving circuit according to claim 22, wherein the reference voltage adjusting circuit further comprises:
a duty cycle control circuit for generating the first clock signal according to a second clock signal, wherein the duty cycle of the first clock signal is less than the duty cycle of the second clock signal.

24. A constant-current driving circuit, for driving a first LED string, the constant-current driving circuit comprising:
a first current source having a terminal coupled to a terminal of the first LED string, wherein a coupling node of the first current source and the first LED string has a first voltage;
a reference voltage generating circuit, for generating a reference voltage and comparing the first voltage with a first predetermined voltage to generate a first comparing signal and thereby dynamically adjust the reference voltage; and
an output signal generating circuit, for outputting an output signal to another terminal of the first LED string, wherein the output signal generating circuit receives an input signal and decides whether or not to output the input signal according to a comparison result between the reference voltage and a second voltage,
wherein the constant-current driving circuit further outputs the output signal to a terminal of a second LED string; and the constant-current driving circuit further comprises a second current source, wherein a terminal of the second current source is coupled to another terminal of the second LED string, the coupling node of the second current source and the second LED string have a third voltage; the reference voltage generating circuit also sequentially compares the first voltage and the third voltage with the first predetermined voltage to sequentially generate the first comparing signal and a second comparing signal, and dynamically adjusts the reference voltage according to the first comparing signal and the second comparing signal.

25. The constant-current driving circuit according to claim 24, wherein the reference voltage generating circuit comprises:
a multiplexer for receiving the first voltage and the third voltage, and sequentially outputting the first voltage and the third voltage according to a first clock signal;
a first comparing circuit for comparing the first voltage and the third voltage with the first predetermined voltage to respectively generate the first comparing signal and the second comparing signal; and
a reference voltage adjusting circuit for generating the reference voltage, wherein the reference voltage adjusting circuit receives and temporally stores the first comparing signal and the second comparing signal and decides whether or not to dynamically adjust the reference voltage based on the first comparing signal and the second comparing signal according to the first clock signal.

26. The constant-current driving circuit according to claim 25, wherein the first comparing circuit comprises a first comparator having a negative input terminal for receiving the output of the multiplexer, a positive input terminal for receiving the first predetermined voltage and an output terminal for outputting the first comparing signal and the second comparing signal.

27. The constant-current driving circuit according to claim 26, wherein the reference voltage adjusting circuit comprises:
a memory unit for receiving and temporally storing the first comparing signal and the second comparing signal, and outputting the first comparing signal and the second comparing signal according to the first clock signal;
an OR gate for generating an operation output signal according to the first comparing signal and the second comparing signal;
a third current source having a terminal coupled to a power voltage;
a first switch having a terminal coupled to another terminal of the third current source, wherein on/off state of the first switch is decided according to the operation output signal;
a second switch having a terminal coupled to another terminal of the first switch, wherein on/off state of the second switch is decided according to the inverting signal of the operation output signal;
a fourth current source having a terminal coupled to another terminal of the second switch and another terminal coupled to a common voltage level; and
a capacitor having a terminal coupled to another terminal of the first switch for outputting the reference voltage and another terminal coupled to the common voltage level.

28. The constant-current driving circuit according to claim 27, wherein the reference voltage adjusting circuit comprises:
an inverter for receiving the operation output signal and thereby outputting the inverting signal of the operation output signal.

29. The constant-current driving circuit according to claim 25, wherein the reference voltage adjusting circuit further decides whether or not to dynamically adjust the reference voltage according to a second clock signal.

30. The constant-current driving circuit according to claim 29, wherein the first comparing circuit comprises a first comparator having a negative input terminal for receiving the output of the multiplexer, a positive input terminal for receiving the first predetermined voltage and an output terminal for outputting the first comparing signal and the second comparing signal.

31. The constant-current driving circuit according to claim 30, wherein the reference voltage adjusting circuit comprises:
a memory unit for receiving and temporally storing the first comparing signal and the second comparing signal, and outputting the first comparing signal and the second comparing signal according to the first clock signal;
an OR gate for generating an operation output signal according to the first comparing signal and the second comparing signal;
a third current source having a terminal coupled to a power voltage;
a first switch having a terminal coupled to another terminal of the third current source, wherein on/off state of the first switch is decided according to the operation output signal;
a second switch having a terminal coupled to another terminal of the first switch, wherein on/off state of the second switch is decided according to the second clock signal;
a third switch having a terminal coupled to another terminal of the second switch, wherein on/off state of the third switch is decided according to the second clock signal;
a fourth switch having a terminal coupled to another terminal of the third switch, wherein on/off state of the fourth switch is decided according to the inverting signal of the operation output signal;
a fourth current source having a terminal coupled to another terminal of the fourth switch and another terminal coupled to a common voltage level; and a capacitor having a terminal coupled to another terminal of the second switch for outputting the reference voltage and another terminal coupled to the common voltage level.

32. The constant-current driving circuit according to claim 31, wherein the reference voltage adjusting circuit further comprises:
a duty cycle control circuit for generating the second clock signal according to the first clock signal, wherein the duty cycle of the second clock signal is less than the duty cycle of the first clock signal.

33. A constant-current driving circuit, for driving a first LED string, the constant-current driving circuit comprising:
a first current source having a terminal coupled to a terminal of the first LED string, wherein a coupling node of the first current source and the first LED string has a first voltage;
a reference voltage generating circuit, for generating a reference voltage and comparing the first voltage with a first predetermined voltage to generate a first comparing signal and thereby dynamically adjust the reference voltage; and
an output signal generating circuit, for outputting an output signal to another terminal of the first LED string, wherein the output signal generating circuit receives an input signal and decides whether or not to output the input signal according to a comparison result between the reference voltage and a second voltage,
wherein the reference voltage generating circuit further compares the first voltage with a second predetermined voltage to generate a second comparing signal and dynamically adjusts the reference voltage according to the first comparing signal and the second comparing signal.

34. The constant-current driving circuit according to claim 33, wherein the reference voltage generating circuit comprises:
a first comparing circuit for comparing the first voltage with the first predetermined voltage to generate the first comparing signal;
a second comparing circuit for comparing the first voltage with the second predetermined voltage to generate the second comparing signal; and
a reference voltage adjusting circuit for generating the reference voltage and dynamically adjusting the reference voltage according to the first comparing signal and the second comparing signal.

35. The constant-current driving circuit according to claim 34, wherein the first comparing circuit comprises a first comparator having a negative input terminal for receiving the first voltage, a positive input terminal for receiving the first predetermined voltage and an output terminal for outputting the first comparing signal; the second comparing circuit comprises a second comparator having a negative input terminal for receiving the first voltage, a positive input terminal for receiving the second predetermined voltage and an output terminal for outputting the second comparing signal.

36. The constant-current driving circuit according to claim 35, wherein the reference voltage adjusting circuit comprises:
a control circuit for receiving the first comparing signal and the second comparing signal, wherein when both of the first comparing signal and the second comparing signal are at a high-level, the control circuit outputs a first control signal; when both of the first comparing signal and the second comparing signal are at a low-level, the control circuit outputs a second control signal; and when the first comparing signal is at a high-level and the second comparing signal is at a low-level, the control circuit does not output any signal;
a second current source having a terminal coupled to a power voltage;
a first switch having a terminal coupled to another terminal of the second current source, wherein on/off state of the first switch is decided according to the first control signal;
a second switch having a terminal coupled to another terminal of the first switch, wherein on/off state of the second switch is decided according to the second control signal;
a third current source having a terminal coupled to another terminal of the second switch and another terminal coupled to a common voltage level; and
a capacitor having a terminal coupled to another terminal of the first switch for outputting the reference voltage and another terminal coupled to the common voltage level.

37. The constant-current driving circuit according to claim 36, wherein the first predetermined voltage is greater than the second predetermined voltage.

38. The constant-current driving circuit according to claim 37, wherein the first predetermined voltage is the operation voltage of the first current source plus a third predetermined voltage, the second predetermined voltage is the operation voltage of the first current source minus the third predetermined voltage, and the third predetermined voltage is smaller than the operation voltage of the first current source.

39. A constant-current driving circuit, for driving a first LED string, the constant-current driving circuit comprising:
a first current source having a terminal coupled to a terminal of the first LED string, wherein a coupling node of the first current source and the first LED string has a first voltage;
a reference voltage generating circuit, for generating a reference voltage and comparing the first voltage with a first predetermined voltage to generate a first comparing signal and thereby dynamically adjust the reference voltage; and
an output signal generating circuit, for outputting an output signal to another terminal of the first LED string, wherein the output signal generating circuit receives an input signal and decides whether or not to output the input signal according to a comparison result between the reference voltage and a second voltage,
wherein the output signal generating circuit comprises:
a third comparing circuit for comparing the reference voltage with the second voltage and generating the comparison result;
a timing control circuit for generating a first timing control signal and a second timing control signal according to the comparison result;
a fifth switch having a terminal coupled to the input signal, another terminal coupled to an output terminal of the output signal generating circuit, wherein on/off state of the fifth switch is decided according to the first timing control signal and the output terminal mentioned above is for outputting the output signal; and
a sixth switch having a terminal coupled to the input signal and another terminal coupled to a common voltage level, wherein on/off state of the sixth switch is decided according to the second timing control signal.

40. The constant-current driving circuit according to claim 39, wherein the fifth switch comprises a PMOS transistor, two source/drains of the PMOS transistor respectively serve as two terminals of the fifth switch and a gate of the PMOS transistor is employed for receiving the first timing control signal; and the sixth switch comprises an NMOS transistor, two source/drains of the NMOS transistor respectively serve as two terminals of the sixth switch and a gate of the NMOS transistor is employed for receiving the second timing control signal.

\* \* \* \* \*